H. R. HIRST & D. UNGARO.
REPAIR TOOL.
APPLICATION FILED NOV. 4, 1913.
1,114,694.
Patented Oct. 20, 1914.
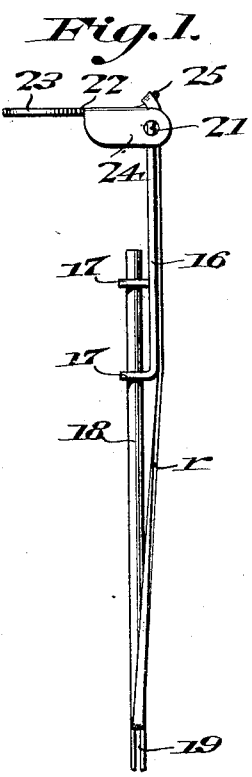
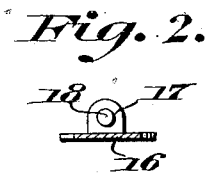
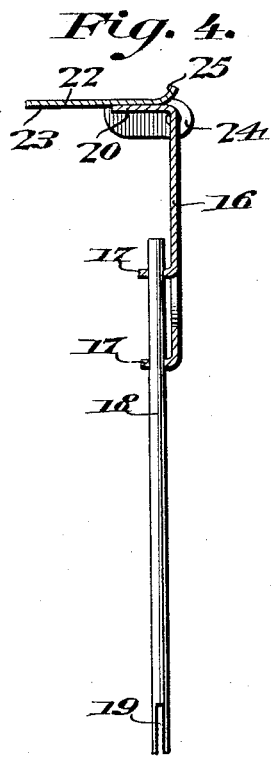
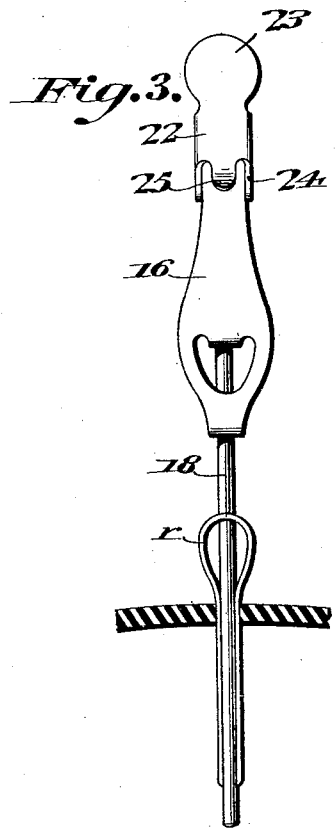
Inventors
Harry R. Hirst &
Daniel Ungaro
By Victor J. Evans
Attorney
Witnesses

UNITED STATES PATENT OFFICE.

HARRY R. HIRST AND DANIEL UNGARO, OF TRENTON, NEW JERSEY.

REPAIR-TOOL.

1,114,694.

Specification of Letters Patent.

Patented Oct. 20, 1914.

Application filed November 4, 1913. Serial No. 799,168.

*To all whom it may concern:*

Be it known that we, HARRY R. HIRST and DANIEL UNGARO, citizens of the United States of America, residing at Trenton, in the county of Mercer and State of New Jersey, have invented new and useful Improvements in Repair-Tools, of which the following is a specification.

This invention relates to certain novel and useful improvements in repair tools for automobile and other inflated tires, and has particular application to a tool of the class described whereby punctures and similar mutilations of the tire may be mended.

In carrying out the present invention, it is our purpose to provide a tool of the class described, by means of which a rubber band or similar elastic element may be inserted within the punctured portion of the tire under tension and subsequently relieved of such tension so as to expand and fill the opening.

Furthermore, we aim to provide a tire repair tool which will embrace the desired features of simplicity, efficiency and durability, coupled with cheapness of cost in manufacture and marketing and which may be readily put into service.

In the accompanying drawing; Figure 1 is a view in side elevation of a tire repair tool constructed in accordance with our present invention. Fig. 2 is a cross sectional view therethrough. Fig. 3 is a view in front elevation thereof. Fig. 4 is a vertical sectional view through the same, parts being shown in elevation.

In the present instance the tool comprises a support 16 formed of a strip of metal and stamped to provide lugs 17 formed with axially alining apertures to receive a needle 18 having the lower end thereof slotted as at 19. The upper end of the support is bent at right angles to itself to form a rest 20 and at the junction of such rest with the main body portion is provided with laterally projecting pintles 21.

22 designates a retainer composed of a strip of metal formed at one end to provide a finger piece 23 and having the opposite side edges adjacent to the other end thereof downturned to provide pivot lugs 24 receiving the pintles 21, the end of the retainer between the lugs being bent upwardly to provide a tongue 25.

In the use of the device illustrated in Figs. 5 and 6, the elastic band $r$ is trained over the retainer 22 and through the slot 19 in the lower end of the needle 18, the retainer resting upon the rest 20 and so holding the elastic band under tension. The pointed extremity of the needle is passed through the mutilated portion of the tire and the retainer 22 swung about the pintles 21 thereby permitting the elastic band to slide over the tongue 25 and so expand in the opening in the tire.

From the foregoing description taken in connection with the accompanying drawing, the construction, mode of operation and manner of employing our invention will be readily apparent. It will be seen that we have provided a tool for mending pneumatic tires and other inflated articles by means of which a rubber band or similar elastic element may be employed to mend a mutilated structure.

While we have herein shown and described one preferred form of our invention by way of illustration, we desire to have it understood that we do not limit or confine ourselves to the precise details of construction herein described and delineated, as modification and variation may be made within the scope of the claims and without departing from the spirit of the invention.

We claim:

1. A tire repair device comprising a needle having the lower end thereof slotted to receive one end of an elastic band, a support connected to the other end of said needle and having a portion thereof bent at right angles to itself to form a rest, a retainer pivoted upon said support at the junction of the bent portions thereof and normally seating upon said rest and adapted to receive the other end of said band and hold the same under tension and capable of swinging movement out of engagement with said rest to release said band substantially as and for the purpose set forth.

2. A tire repair device comprising a needle having the lower end thereof slotted to receive one end of an elastic band, a support connected to the other end of said needle and having the outer end thereof equipped with a rest, a retainer pivoted upon said support at the junction of the latter with the rest and normally seating upon said rest and adapted to receive the other end of said band and hold the same under tension and capable of swinging movement out of engagement with said rest to release said band substantially as and for the purpose set forth.

In testimony whereof we affix our signatures in presence of two witnesses.

HARRY R. HIRST.
DANIEL UNGARO.

Witnesses:
 CHARITY S. ROBBINS,
 ELLERY ROBBINS.

Copies of this patent may be obtained for five cents each, by addressing the "Commissioner of Patents, Washington, D. C."